May 6, 1969     C. J. KRAYENBRINK     3,443,203
VOLTAGE REGULATOR INCLUDING A SWITCHING PREREGULATOR
Filed Sept. 29, 1966
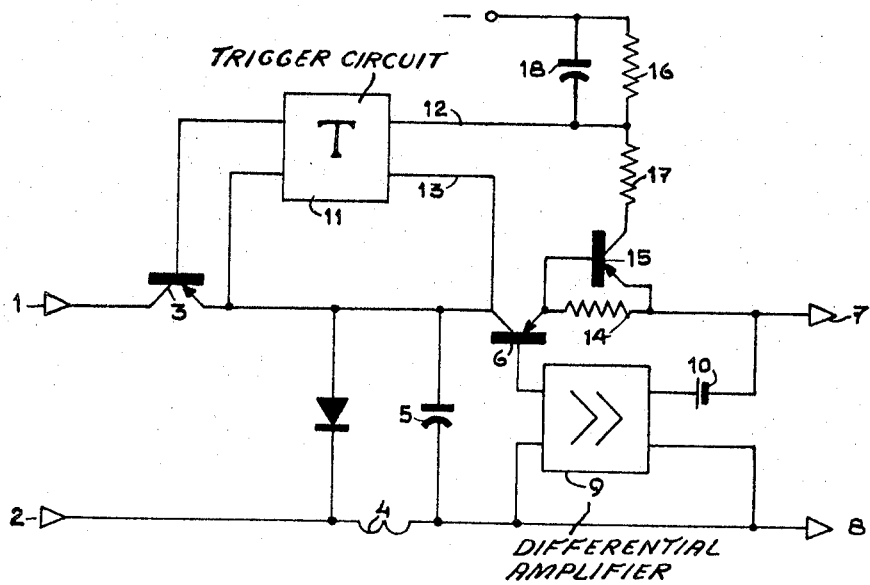
*INVENTOR.*
CORNELIS JOSEPHUS KRAYENBRINK
BY
*Barlow & Barlow*
ATTORNEYS

# United States Patent Office 3,443,203
Patented May 6, 1969

3,443,203
VOLTAGE REGULATOR INCLUDING A SWITCHING PREREGULATOR
Cornelis J. Krayenbrink, Zoetermeer, Netherlands, assignor, by mesne assignments, to North American Philips Company, Inc., New York, N.Y., a corporation of Delaware
Filed Sept. 29, 1966, Ser. No. 582,831
Claims priority, application Netherlands, Sept. 30, 1965, 6512723
Int. Cl. G05f 1/40, 1/52, 1/60
U.S. Cl. 323—22                                9 Claims

ABSTRACT OF THE DISCLOSURE

A voltage regulator that includes a switching preregulator and a buffer capacitor connected across the input terminals. A series regulator and a resistor are connected in series between the buffer capacitor and the output terminals. The voltage across the series regulator and the voltage across the resistor are applied to the input of a trigger circuit in opposite sense. The trigger circuit supplies a switching signal to the switching preregulator that controls the switching thereof in a manner that causes the voltage across the series regulator to vary inversely with the load current.

---

The present invention relates to a voltage regulator circuit and more particularly to a voltage regulator that incorporates a switching preregulator stage. This type of voltage regulator generally includes a series regulator which is supplied from a source of unstabilized voltage through a preregulator designed as a switching element. The preregulator is switched by a trigger circuit which renders the preregulator conducting as soon as the voltage across the series regulator falls below a predetermined minimum value and renders the preregulator non-conducting as soon as this voltage rises above a predetermined maximum value.

The purpose of such a combination of a preregulator and a series regulator is to be able to handle large powers while maintaining the dissipation in the regulators at a moderate level. Since the preregulator is designed as a switching element, the dissipation occurring therein is very low. Furthermore, due to the preregulator control referred to, the voltage across the series regulator is limited so that even with large output currents, no inadmissibly high dissipation in the series regulator occurs.

Such a voltage stabiliser circuit, in which the preregulator control is determined exclusively by the voltage across the series regulator, exhibits an unfavourable behaviour with sudden heavy increases of the output current. The problem occurs because a sudden increase of the output current causes a corresponding discharge of the buffer capacitor, which cannot be compensated immediately by a compensating charge through the preregulator.

When the voltage regulators supplies its maximum output current, the trigger circuit maintains the voltage across the series regulator at a low value in order not to exceed the maximum admissible dissipation of the series regulator. In this case, a temporary decrease of the voltage across the buffer capacitor can temporarily lower the voltage across the series regulator below the minimum value at which satisfactory operation of the series regulator is still guaranteed. Therefore, the output voltage can temporarily fall below the adjusted value upon a sudden heavy increase of the output current.

The invention is based upon the recognition that it is allowable to increase the voltage across the series regulator, set up by the trigger circuit, during periods in which only a comparatively small output current is drawn because the small output current cannot give rise to an inadmissibly high dissipation in the series regulator.

It is a feature of a voltage stabilizer circuit according to the invention, that from a resistor through which the output current flows, which is known per se, a voltage is derived, which after amplification so controls the trigger circuit, that within the range in which the output voltage is maintained constant, the voltage across the series regulator due to the preregulator control is maintained at a comparatively high value for small values of the output current and is maintained at progressively decreasing values for progressively increasing output currents.

It is remarked in this connection, that it is known per se in a voltage stabilizer circuit of the type referred to, to so apply the voltage derived from the resistor through a threshold device to the series regulator, that upon current overload the series regulator is blocked, whereby the output voltage is lowered and damage is prevented. However, in that case the preregulator is still controlled so as to keep the voltage across the series connection of the series regulator and the resistor constant. In a voltage stabilizer circuit according to the invention, on the other hand, in the range of operation in which no current overload is present and the output voltage is for that reason being stabilized, a control of preregulator is effected, due to which the voltage of the series connection referred to is made strongly dependent upon the load current.

In that case, a temporary decrease of the voltage across the buffer capacitor, caused by a sudden increase of the output current, cannot give rise to undesired phenomena, since this voltage decrease is allowable in view of the comparatively high voltage across the series regulator which is adjusted for a small output current. This voltage reserve does not exist to any great extent or does not exist at all if a comparatively high output current is taken off, but in that case such a voltage reserve is not required, since at already high values of the output current, no large increases of the output current need be dealt with.

The invention is further elucidated below with reference to the drawing, which represents a circuit diagram of a stabilizer circuit according to the invention.

In the drawing, a source of unstabilized supply voltage (not shown) is connected to the input terminals 1 and 2 of the stabilizer circuit. The source voltage is supplied through a preregulator 3, effective as a switching element, and a choke 4, to a buffer capacitor 5. The voltage across the buffer capacitor 5 supplies, through a proportionally operative series regulator 6, the output terminals 7 and 8, at which a variable load can be connected. Notwithstanding variations of the output current, the voltage between the output terminals 7 and 8 is kept constant by means of a differential amplifier 9. The input terminals of amplifier 9 are connected to the output terminals 7 and 8 through a source of reference voltage 10 shown as a battery, but in practice usually designed differently. The output of the differential amplifier 9 controls the series regulator 6. The switching operation of the preregulator 3 is controlled by a trigger circuit 11 which responds to the voltage across the series regulator 6 and which by opening and closing the preregulator 3 and the consequent control of the charge of the buffer capacitor 5 keeps the voltage across the series regulator 6 within allowable limits. For that purpose, the input connections 12 and 13 of the trigger circuit 11 are usually connected to the two main electrodes of the series regulator 6. The trigger circuit 11 is so controlled that the preregulator 3 is closed if the voltage between the main electrodes of the series regulating transistor 6 exceeds a predetermined value, whilst the preregulator 3 is again opened by the trigger circuit if the voltage between these main electrodes falls below this predetermined value.

Although in the embodiment shown, the preregulator as well as the series regulator consists of a transistor, other components too, such as electron tubes, are eligible for that purpose.

The circuit as described so far is entirely conventional and for that reason need not be elucidated in further detail.

If the output current at the terminals 7 and 8 suddenly increases, this is accompanied by an immediate discharge of the buffer capacitor 5. However, due to the presence of the choke 4, the capacitor discharge cannot immediately be compensated by a corresponding charge of the buffer capacitor 5 by means of the preregulator 3, although the preregulator is rendered conducting by the trigger circuit 11 as soon as the voltage across the series regulator 6 has reached the minimum value. Therefor, there is a risk that the voltage across the series regulator 6, due to the temporary decrease of the voltage across the buffer capacitor 5, temporarily falls below the minimum admissible value for good operation of the series regulator 6. In this case the output voltage at the terminals 7 and 8 also temporarily falls below the adjusted value, even though this voltage will recover as soon as the charge of the buffer capacitor 5 through the preregulator 3 has followed the discharge of the buffer capacitor 5 due to the output current.

According to the invention, this is taken care of by controlling the trigger circuit 11 not only with the voltage across the series regulator 6, but also with a voltage which is dependent upon the output current through the terminals 7 and 8.

In the embodiment shown, this is obtained by connecting a resistor 14 in series with the series regulator 6, at the ends of which resistor the control electrodes of an amplifier element 15 are connected. In the embodiment shown, the amplifier element 15 is a transistor, but basically other amplifier elements are also suitable for the purpose intended. The output circuit of the amplifier element 15 comprises resistors 16 and 17 connected to a source of auxiliary voltage. Although the input lead 13 of the trigger circuit 11 is as usual connected to the one main electrode of the series regulator 6, in the case shown the collector electrode, the other input lead 12 of the trigger circuit is not, as usual, connected to the other main electrode of the series regulator 6, in the case shown the emitter electrode, but to the output circuit of the amplifier element 15, in the embodiment shown the junction of the resistors 16 and 17. As the output current through the resistor 14 becomes smaller, the amplifier element 15 conducts a lower current, whereby a larger part of the auxiliary voltage is present between the input lead 12 of the trigger circuit 11 and the emitter electrode of the series regulator 6. This voltage in the input circuit of the trigger circuit 11 counteracts the voltage across the series regulator and does so to a larger extent as the output current to the resistor 14 is lower. Since the trigger circuit 11 through the preregulator 3 tries to maintain an approximately constant input voltage between the input leads 12 and 13, a higher voltage is therefor obtained across the series regulator 6 as the output current becomes lower.

Since especially at low values of the output current, sudden heavy increases of the output current must be expected, the high voltage across the series regulator 6 for low values of the output current makes it possible to accommodate the temporary decreases of the voltage across the buffer capacitor 5, which accompany heavy increases of the output current, and without an inadmissible lowering of the voltage across the series regulator 6. Although in the described case the voltage which is generated by the intermediary of the amplifier element 15 counteracts the voltage across the series regulator 6, these voltages can also be operative in the same sense in the input circuit of the trigger circuit 11, provided that care is taken that the variation of the voltage generated by the amplifier element 15 upon decreasing output current, is operative in the input circuit of the trigger circuit 11 in opposite direction to the voltage across the series regulator 6. In both cases, an auxiliary voltage source can be connected in the input lead 12 or 13 of the trigger circuit if the switching level of the trigger circuit 11 makes this desirable.

A further improvement of the operation of a device according to the invention can be obtained by incorporating a time constant circuit in the current dependent part of the control circuit for the trigger circuit 11. In this case, variations of the current dependent part of the input voltage for the trigger circuit 11 are delayed with respect to the original variations of the output current.

In that case, a sudden increase of the output current, after a certain time delay determined by the time constant circuit, causes a decrease of the nominal value across the series regulator 6, whereby a larger time interval is available for adapting the charge of the buffer capacitor 5 to the discharge thereof by the output current. For that purpose, a capacitor 18 can be shunted across a resistor 16 in the output circuit of the amplifier element 15.

Since an increase of the output current in that case is not immediately accompanied by a decrease of the nominal voltage across the series regulator 6, it is possible that when making use of such a time constant circuit, the instantaneous dissipation in the series regulator 6 temporarily exceeds the maximum allowable dissipation. However, this need not be a disadvantage, since this excess dissipation is only of limited duration and in most cases can easily be handled by the thermal capacity of the series regulator 6.

What I claim is:

1. A voltage regulator comprising input terminals for receiving an unregulated direct voltage and output terminals for supplying a regulated direct voltage to a load, switching preregulator means, a buffer capacitor, means connecting said preregulator means and said capacitor across said input terminals, a series regulator connected between said buffer capacitor and said output terminals, a resistor connected in series with said series regulator between said capacitor and said output terminals, an amplifier arranged to amplify the voltage drop across said resistor to provide a first control voltage that is proportional to the D.C. load current, a trigger circuit having input means and output means, means for applying to said trigger circuit input means a second control voltage that is proportional to the voltage developed across said series regulator, means for coupling said first control voltage to said trigger circuit input means in a sense to oppose said second control voltage, and means for coupling a switching signal developed at said trigger circuit output means to a control input of said switching preregulator means for selectively rendering said preregulator means conductive as a function of said first and second control voltages to cause the voltage across said series regulator to vary inversely with the load current.

2. A regulator as claimed in claim 1 wherein said trigger circuit input means comprises first and second input terminals connected to an output terminal of said amplifier and an input terminal of said series regulator, respectively, whereby the trigger circuit is controlled by the difference in voltage between the voltage across the series regulator and the amplified voltage developed across said series resistor.

3. A regulator as claimed in claim 2 wherein said series resistor is connected between an output terminal of said series regulator and one of said output terminals of the voltage regulator, means for connecting the input electrodes of said amplifier across the terminals of said series resistor, a source of auxiliary voltage, a second resistor, and means connecting the output electrode of said amplifier to said auxiliary voltage by means of said second resistor.

4. A regulator as claimed in claim 3 further comprising a time delay network that includes a capacitor connected in the output circuit of said amplifier for delaying the response of said trigger circuit to variations in the load current.

5. A regulator as claimed in claim 1 wherein said amplifier includes a time-delay network for delaying the response of said trigger circuit to variations in the load current.

6. A voltage regulator comprising, input terminals for a source of unregulated voltage, output terminals for supplying a regulated direct voltage to a load, transistor switching means, a capacitor, means serially connecting said transistor switching means and said capacitor across said input terminals, a control transistor connected in series with said transistor switching means and said input and output terminals, means responsive to the D.C. load current for providing a control voltage that is proportional thereto, a trigger circuit jointly responsive in opposite sense to variations in the voltage across said control transistor and to varations in said control voltage for deriving a switching signal, and means for coupling said switching signal to a control electrode of said transistor switching means to selectively switch said switching means into and out of conduction as a function of the voltage across the control transistor and the load current, said switching means being controlled by the trigger circuit in a sense to maintain the voltage across said control transistor within a given range of values and to cause said voltage to vary inversely with the load current.

7. A regulator as claimed in claim 6 wherein said control voltage providing means comprises a resistor connected in series with said control transistor so that the load current flows therein.

8. A regulator as claimed in claim 7 further comprising means responsive to the voltage at said output terminals for supplying a control signal to a control electrode of said control transistor for controlling the current flow therein.

9. A regulator as claimed in claim 6 wherein said control voltage providing means includes a time delay circuit arranged to delay the application of said control voltage to the trigger circuit.

References Cited

UNITED STATES PATENTS 3,068,392 12/1962 Santelmann.
3,260,920 7/1966 Shoemaker.
3,284,692 11/1966 Gautherin.

OTHER REFERENCES

Riordon, "Power Supply Uses Switching Preregulation," Electronics, March 9, 1962, pp. 62–64.

JOHN F. COUCH, *Primary Examiner.*

A. D. CELLINEN, *Assistant Examiner.*

U.S. Cl. X.R.

323—38